(12) United States Patent
Matsumoto

(10) Patent No.: US 10,081,131 B2
(45) Date of Patent: Sep. 25, 2018

(54) THREE-DIMENSIONAL PRINTER

(71) Applicant: Sodick Co., Ltd., Kanagawa (JP)

(72) Inventor: Itaru Matsumoto, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 15/588,699

(22) Filed: May 8, 2017

(65) Prior Publication Data

US 2017/0355136 A1    Dec. 14, 2017

(30) Foreign Application Priority Data

Jun. 14, 2016   (JP) .................. 2016-117862

(51) Int. Cl.
*B29C 67/00* (2017.01)
*B29C 64/153* (2017.01)
*B29C 64/214* (2017.01)
*B29K 77/00* (2006.01)

(52) U.S. Cl.
CPC .......... *B29C 64/153* (2017.08); *B29C 64/214* (2017.08); *B29K 2077/00* (2013.01)

(58) Field of Classification Search
CPC ..... B29C 64/153; B29C 64/214; B33Y 10/00; B33Y 30/00
USPC ....................................... 425/375
See application file for complete search history.

(56) References Cited

U.S. PATENT DOCUMENTS

2015/0367415 A1* 12/2015 Buller ................... B33Y 50/02
425/174.4
2016/0311025 A1 10/2016 Kaneko

FOREIGN PATENT DOCUMENTS

JP        3557970        8/2004
JP        5888826        3/2016

* cited by examiner

*Primary Examiner* — Joseph S Del Sole
*Assistant Examiner* — Thu Khanh T Nguyen
(74) *Attorney, Agent, or Firm* — JCIPRNET

(57) ABSTRACT

A three-dimensional (3D) printer includes a powder layer forming device (2) uniformly spreading material powder in a molding space (R) in a chamber (1) to form a powder layer (8), and a laser irradiation device (4) irradiating a laser beam (L) on a predetermined irradiation region of the powder layer to form a sintered layer (9). The powder layer forming device includes a recoater head (23) discharging the contained material powder to the molding space, a blade (31, 33) leveling the discharged material powder to a predetermined thickness, and a holding member (35, 37) holding the blade on the recoater head, wherein the blade is flexible, and the blade and the holding member are nonmagnetic and electrically conductive.

10 Claims, 9 Drawing Sheets

THREE-DIMENSIONAL PRINTER

CROSS-REFERENCE TO RELATED APPLICATION

This application claims the priority benefit of Japan Application no. 2016-117862, filed on Jun. 14, 2016. The entirety of the above-mentioned patent application is hereby incorporated by reference herein and made a part of this specification.

BACKGROUND OF THE INVENTION

Field of the Invention

The invention relates to a three-dimensional (3D) printer, particularly to a three-dimensional printer which uniformly spreads material powder to sinter a powder layer, and laminates sintered layers to form a molded object.

Description of Related Art

In powder sintering laminate molding method by a laser beam, material powder is uniformly spread on a table to form a powder layer. A laser beam is irradiated on a predetermined portion of the powder layer to sinter the predetermined portion, thereby forming a sintered layer. The material powder is uniformly spread on this sintered layer to form a new powder layer. A laser beam is irradiated on the new powder layer to sinter the new powder layer, thereby forming a new sintered layer joined to the lower sintered layer. Then, by repeating these processes, a plurality of sintered layers are laminated to form a desired three-dimensional molded object composed of an integrated sintered body.

Herein, a three-dimensional printer is well-known which moves a recoater head on a table in a horizontal uniaxial direction to supply material powder onto the table, and levels the supplied material powder to a uniform thickness by a blade attached to the recoater head while applying a predetermined pressure to the material powder, so as to form a powder layer having a predetermined thickness. As shown in Patent Document 1, a plate-like blade made of metal and having rigidity is generally used. Hereinafter, such material powder layer forming operation is referred to as recoating.

In addition, when the laser beam is irradiated to sinter the powder layer, spark particles scatter, and spark particles may adhere to a surface of the sintered layer to form a projected abnormal sintered portion. If the abnormal sintered portion is formed higher than an upper end surface of the material powder layer, during recoating, the blade sometimes collides with the abnormal sintered portion. As shown in Patent Document 2, a three-dimensional printer is well-known in which when the blade collides with the abnormal sintered portion, the abnormal sintered portion is removed by a cutting tool.

PRIOR ART LITERATURE

Patent Documents

Patent Document 1: JP Patent No. 3557970
Patent Document 1: JP Patent No. 5888826

SUMMARY OF THE INVENTION

Problem to be Solved

In the three-dimensional printer as described above, when a molded object has a fine and unstable shape (hereinafter simply referred to as fine shape), and an abnormal sintered portion is formed in the fine shaped portion, there is a risk that, in recoating or cutting and removal of the abnormal sintered portion, when the blade or the cutting tool contacts the abnormal sintered portion, the so-far-molded sintered body may be destroyed. The fine shape is, for example, columnar portions or a vertical wall portion carrying an upper portion. Also, there is a risk that the cutting tool may be caught by the abnormal sintered portion and be damaged. In addition, even if molding is performed without any problem, the cutting and removal of the abnormal sintered portion takes a certain amount of time.

In addition, when the recoating is performed by a blade having rigidity, since the blade is moved while the supplied material powder is compacted, pressure is applied to the sintered body to no small extent. Hence, when the recoating is performed on the fine shaped portion, there is a risk that the fine shaped portion may be brought down to cause a sintering failure. In addition, the blade is relatively likely to wear and short-term periodic replacement becomes necessary.

In addition, in order to form not only a flat powder layer but also a flat sintered layer, it is necessary to remove magnetism or static electricity from the material powder during recoating.

The invention is made in view of such circumstances and mainly aims to provide a three-dimensional printer capable of stably shaping a molded object having a fine shape by performing recoating by a blade that is flexible, nonmagnetic and electrically conductive, and capable of suppressing wear of the blade so as to mold a high-quality molded object at higher speed compared to the prior art.

Means to Solve the Problem

According to the invention, a three-dimensional printer is provided including a chamber (1) covering a molding space (R), a powder layer forming device (2) uniformly spreading material powder in the molding space (R) for each divided layer obtained by dividing a desired three-dimensional molded object at predetermined heights so as to form a powder layer (8), and a laser irradiation device (4) irradiating a laser beam (L) on a predetermined irradiation region of the powder layer (8) to form a sintered layer (9), wherein the powder layer forming device (2) includes a recoater head (23) containing the material powder and discharging the material powder to the molding space (R), a blade (31, 33) leveling the discharged material powder to a predetermined thickness, and a holding member (35, 37) holding the blade (31, 33) on the recoater head (23), the blade (31, 33) being flexible, and the blade (31, 33) and the holding member (35, 37) being nonmagnetic and electrically conductive.

Effect of the Invention

In the three-dimensional printer according to the invention, recoating is performed by the blade that is flexible, nonmagnetic and electrically conductive. Hence, the pressure applied to the sintered body during recoating can be minimized as much as possible, and it is not necessary to remove the abnormal sintered portion. Furthermore, a flat powder layer can be formed. As a result, a molded object having a fine shape can be stably shaped, and wear of the blade is suppressed, so that a high-quality molded object can be molded at higher speed compared to the prior art.

DESCRIPTION OF THE EMBODIMENTS

Embodiments of the invention are explained below using drawings. Various modifications of the components explained below can be arbitrarily combined.

Figure 1:
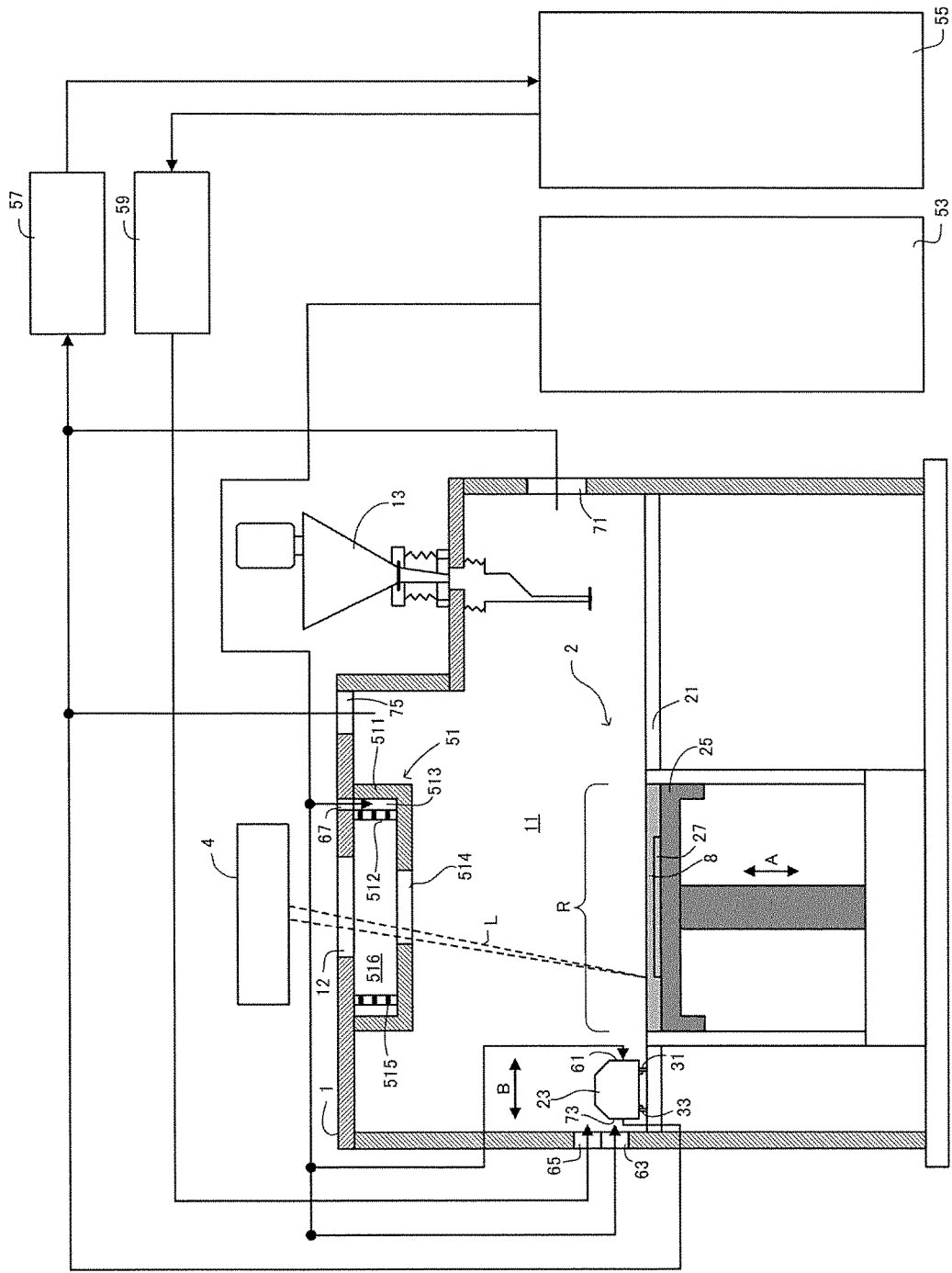
FIG. 1 is a configuration diagram of a three-dimensional printer according to an embodiment of the invention.

As shown in FIG. 1, a three-dimensional printer according to an embodiment of the invention includes a chamber 1 configured to be substantially hermetically sealed, and a build chamber 11 is provided inside the chamber 1. A powder layer forming device 2 is provided inside the chamber 1. The powder layer forming device 2 includes a base table 21 having a molding space R in a central penetration portion, a recoater head 23 arranged on the base table 21 and configured to be movable in a horizontal uniaxial direction (direction shown by arrow B), a pair of blades 31 and 33 flattening material powder discharged from the recoater head 23 so as to form a powder layer 8, and a pair of holding members 35 and 37 holding the pair of blades 31 and 33 respectively on the recoater head 23. A table 25 movable in an up-down direction (direction shown by arrow A) is provided in the molding space R. During use of the three-dimensional printer, a molding plate 27 is arranged on the table 25, and the material powder layer 8 is formed on the molding plate 27.

Figure 2:
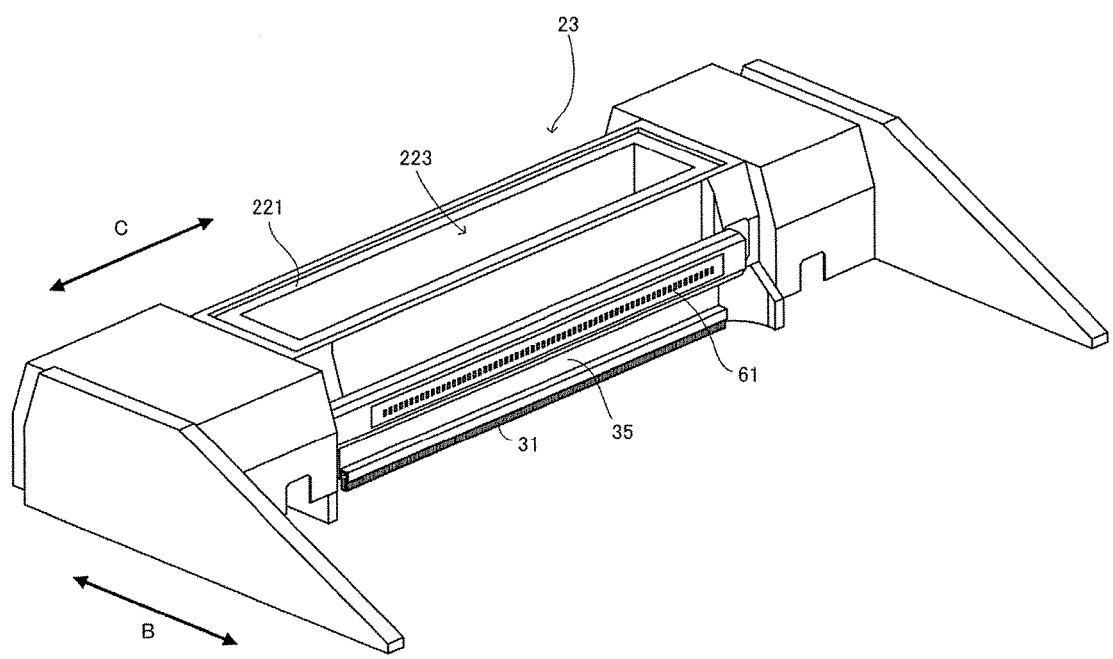
FIG. 2 is a perspective view of a recoater head 23.
Figure 3:
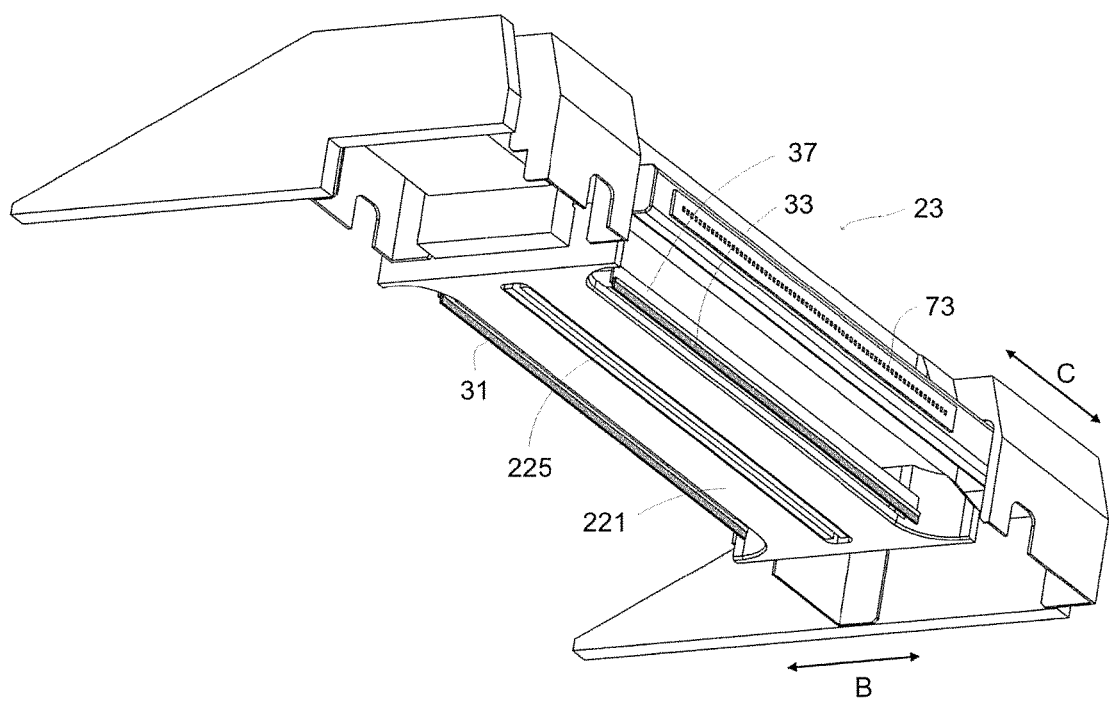
FIG. 3 is a perspective view of the recoater head 23 as viewed from another angle.

As shown in FIG. 2 and FIG. 3, the recoater head 23 includes a material containing portion 221 storing material powder supplied from a material supply device 13 shown in FIG. 1, a material supply portion 223 provided on an upper surface of the material containing portion 221 and serving as a mouth for receiving the material powder, and a material discharge portion 225 provided on a bottom surface of the material containing portion 221 and discharging the material powder contained in the material containing portion 221. The material discharge portion 225 has a slit shape extending in a horizontal uniaxial direction (direction shown by arrow C) orthogonal to a moving direction (direction shown by arrow B) of the recoater head 23. The pair of blades 31 and 33 are respectively attached to both side surfaces of the recoater head 23 by the holding members 35 and 37. The blades 31 and 33 are flexible to the extent that they can pass over an abnormal sintered portion during recoating, and have, for example, a brush shape. The material powder is, for example, metal powder such as iron powder or the like formed into a spherical shape having an average particle size of 25 μm. The material powder may also be, for example, resin powder such as nylon powder or the like.

Figure 4A:
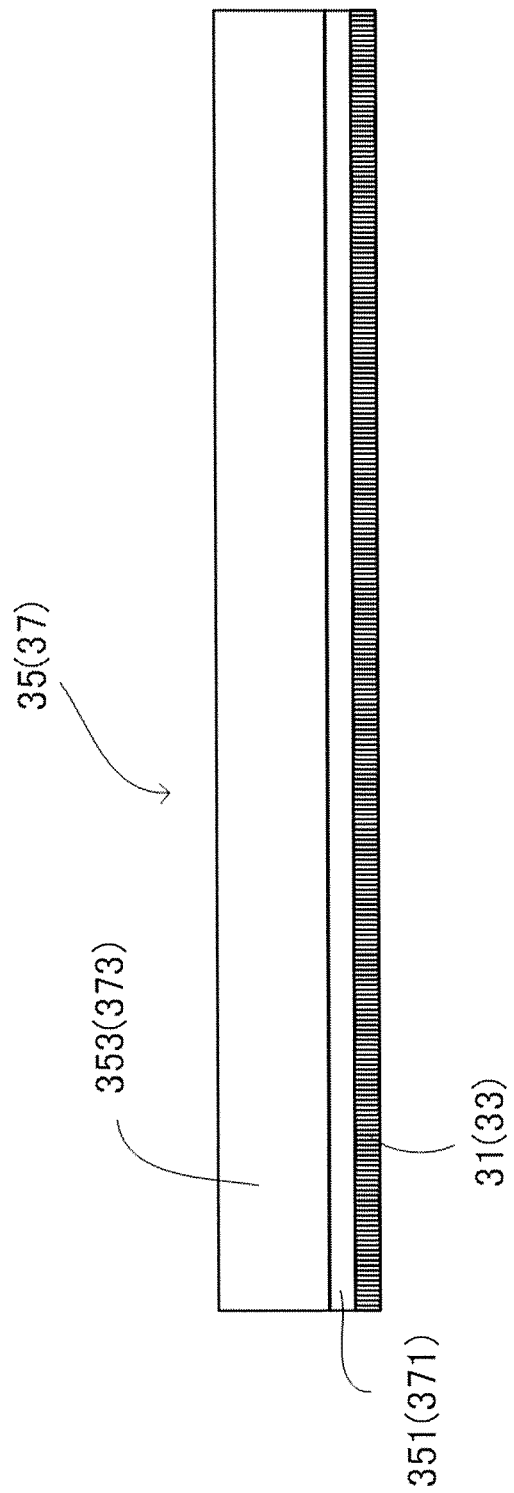
FIG. 4A is a front view of blades 31 and 33 and holding members 35 and 37.
Figure 4B:
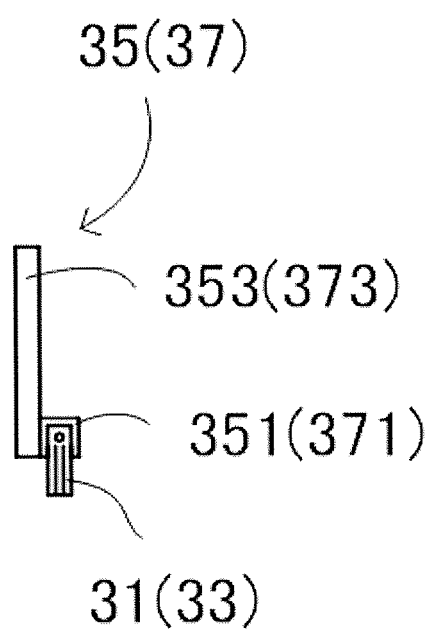
FIG. 4B is a left side view of blades 31 and 33 and holding members 35 and 37.

Herein, specific configurations of the blades 31 and 33 and the holding members 35 and 37 are explained based on FIGS. 4A and 4B. FIG. 4A is a front view of the blades 31 and 33 and the holding members 35 and 37. FIG. 4B is a left side view of blades 31 and 33 and holding members 35 and 37. The blades 31 and 33 are belt-like brush-shaped in which a large number of fibers are uniformly arranged in a longitudinal direction (direction shown by arrow C). The holding members 35 and 37 respectively include channels 351 and 371 having longitudinal grooves for holding the blades 31 and 33, and flat bars 353 and 373 fixing the channels 351 and 371 to the side surfaces of the recoater head 23. Moreover, the pair of blades 31 and 33 and the holding members 35 and 37 respectively have the same shape.

Moreover, in the present embodiment, the brush-shaped blades 31 and 33 are provided on both sides of the recoater head 23. However, the blades 31 and 33 may be in any other form, for example, a flat plate shape, as long as they are flexible to the extent that they can pass over the abnormal sintered portion during recoating. In addition, the blade may also be provided on only one side surface of the recoater head 23. The holding members 35 and 37 may also be in any other form as long as they can attach the blades 31 and 33 to the recoater head 23. In addition, the blades 31 and 33 and the holding members 35 and 37 may also be integrally formed.

Moreover, in order to form a more smooth powder layer 8, it is desired that the blades 31 and 33 and the holding members 35 and 37 be demagnetized and have static electricity removed therefrom. Hence, the blades 31 and 33 and the holding members 35 and 37 are nonmagnetic (having an absolute value of magnetic susceptibility χ of 0.1 or less), and are configured to be electrically conductive (having electrical conductivity of $10^6$ S/m or more). In addition, the table 25 has a heater therein, and the powder layer 8 is preheated to a temperature (desirably 50° C. or higher to 120° C. or lower) suitable for sintering with a laser beam L. Hence, it is desired that the blades 31 and 33 have heat resistance against the preheat temperature of the powder layer 8. From the above, as a material of the blades 31 and 33 and the holding members 35 and 37, carbon fiber-reinforced plastic, austenite such as austenitic stainless steel or the like, copper, aluminum, brass, electrically conductive silicone or the like is selected. However, since it will be difficult to form a flat powder layer 8 if the blades 31 and 33 bend excessively, it is desired that bending stress of the material of the blades 31 and 33 be about 50 MPa or more to 150 MPa or less. Particularly, in the present embodiment, since carbon fiber-reinforced plastic is flexible and has a relatively high Young's modulus, it is adopted as the material of the blades 31 and 33. In addition, in the present embodiment, since austenitic stainless steel has strength, corrosion resistance and a relatively low cost, it is adopted as the material of the holding members 35 and 37. More specifically, in the present embodiment, a composite material obtained by containing Polyamide 6 and electrically conductive carbon black on the basis of Polyamide 66 is used for the blades 31 and 33, and SUS 304 is used for the holding members 35 and 37.

In addition, in order to form a more smooth powder layer 8, it is desired that a tip of the blades 31 and 33 have surface roughness equal to or less than the value of the average particle size of the material powder. With such configuration, a more smooth powder layer 8 can be formed. For example, when the average particle size of the material powder is 25 μm, it is desired that the surface roughness of the tip of the blades 31 and 33 in terms of maximum height roughness Rz be 25 μm or less (the maximum height roughness Rz is defined in Japanese Industrial Standards (JIS) B 0601: 2013). The material powder is formed into a predetermined size suitable for sintering and having an average particle size ranging from several μm to several tens of μm depending on the type of the material.

A laser irradiation device 4 is provided above the chamber 1, and the laser beam L outputted from the laser irradiation device 4 is transmitted through a window 12 provided on the chamber 1 and is irradiated onto a predetermined irradiation region of the powder layer 8 formed in the molding space R, so as to form a sintered layer 9. The predetermined irradiation region is present in the molding space R and approximately matches a region surrounded by an outline of a desired three-dimensional molded object. The laser irradiation device 4 may be configured to be capable of two-dimensionally scanning the laser beam L in the molding space R, and consists of, for example, a laser source generating the laser beam L and a pair of galvanometer scanners capable of two-dimensionally scanning the laser beam L in the molding space R. The type of the laser beam L is not limited as long as it is capable of sintering the material powder, and examples thereof include $CO_2$ laser, fiber laser, YAG laser and so on. The window 12 is formed of a material capable of transmitting the laser beam L. For example, when the laser beam L is a fiber laser or a YAG laser, the window 12 may be formed of quartz glass.

Next, an inert gas supply/discharge system is explained. The inert gas supply/discharge system of the present embodiment includes a fume diffusing device 51, an inert gas supply device 53, a fume collector 55, duct boxes 57 and 59, all supply ports and all discharge ports provided on the chamber 1, and piping connecting the inert gas supply device 53 and the fume collector 55 with each of the supply ports and each of the discharge ports. The inert gas supply/discharge system supplies an inert gas so that the chamber 1 is filled with the inert gas at a predetermined concentration at all times, and discharges the inert gas polluted by fumes that are generated due to the irradiation of the laser beam L outside the chamber 1. Moreover, in this specification, the inert gas refers to a gas which substantially does not react with metal material powder, and is exemplified by nitrogen gas, argon gas, helium gas and so on.

A recoater head supply port 61 is provided on one side of the recoater head 23 along the direction shown by arrow C, so as to face a chamber discharge port 71 when the recoater head 23 is located on opposite side where the material supply device 13 is disposed to have the predetermined irradiation region sandwiched between.

The chamber discharge port 71 is provided on a side plate of the chamber 1 at a predetermined distance from the predetermined irradiation region so as to face the recoater head supply port 61. Preferably, a suction device (not illustrated) is provided to be connected to the chamber discharge port 71, and the fumes are efficiently removed from an irradiation path of the laser beam L. At this moment, by the suction device, larger amounts of fumes can be discharged at the chamber discharge port 71, and the fumes are unlikely to diffuse into the build chamber 11.

A chamber supply port 63 is provided on an end of the base table 21 so as to face the chamber discharge port 71 with the predetermined irradiation region therebetween. When the recoater head 23 passes through the predetermined irradiation region and the recoater head supply port 61 is located in a position facing the chamber discharge port 71 without the predetermined irradiation region therebetween, the chamber supply port 63 is selectively switched from the recoater head supply port 61 and is opened. Accordingly, the chamber supply port 63 supplies to the chamber discharge port 71 an inert gas having the same predetermined pressure and flow rate as those of the inert gas supplied from the recoater head supply port 61. Thus, a flow of the inert gas is always produced in the same direction, which is advantageous in terms of capable of performing stable sintering.

A recoater head discharge port 73 is provided along the direction shown by arrow C on a side surface opposite to the one side of the recoater head 23 on which the recoater head supply port 61 is provided. When the inert gas cannot be supplied from the recoater head supply port 61, in other words, when the inert gas is supplied from the chamber supply port 63, a flow of the inert gas is produced at a position closer to the predetermined irradiation region to discharge some fumes. Thus, the fumes can be efficiently removed from the irradiation path of the laser beam L.

In addition, the inert gas supply/discharge system of the present embodiment includes a secondary supply port 65 provided on a side plate of the chamber 1 so as to face the chamber discharge port 71 and supplying to the build chamber 11 a clean inert gas which is fed from the fume collector 55 and from which fumes have been removed, a fume diffusing device supply port 67 provided on an upper surface of the chamber 1 and supplying the inert gas to the fume diffusing device 51, and a secondary discharge port 75 provided on an upper side of the chamber discharge port 71 and discharging the inert gas remaining on an upper side of the chamber 1 that contains a large amount of fumes.

The fume diffusing device 51 is provided on the upper surface of the chamber 1 so as to cover the window 12. The fume diffusing device 51 includes a cylindrical housing 511 and a cylindrical diffusing member 512 arranged inside the housing 511. An inert gas supplying space 513 is provided between the housing 511 and the diffusing member 512. In addition, an opening portion 514 is provided on a bottom surface of the housing 511 inward of the diffusing member 512. A large number of pores 515 are provided on the diffusing member 512, and the clean inert gas supplied to the inert gas supplying space 513 through the fume diffusing device supply port 67 fills a clean space 516 through the pores 515. Then, the clean inert gas that fills the clean space 516 is ejected toward below the fume diffusing device 51 through the opening portion 514. The ejected clean inert gas flows out along the irradiation path of the laser beam L to remove the fumes from the irradiation path of the laser beam L, so as to prevent the window 12 from being polluted by the fumes.

The three-dimensional printer of the present embodiment includes the inert gas supply device 53 and the fume collector 55. The inert gas supply device 53 is a device having an inert gas supplying function and including, for example, a membrane type nitrogen separator that extracts nitrogen gas from surrounding air. The fume collector 55 has the duct boxes 57 and 59 respectively on its upstream side and downstream side. The fume-containing inert gas discharged from the chamber 1 is sent to the fume collector 55 through the duct box 57, and the clean inert gas from which fumes have been removed at the fume collector 55 is sent to the secondary supply port 65 of the chamber 1 through the duct box 59. By such configuration, reuse of the inert gas becomes possible.

As an inert gas supply system, as shown in FIG. 1, the inert gas supply device 53 is connected respectively to the recoater head supply port 61, the chamber supply port 63 and the fume diffusing device supply port 67. In addition, the fume collector 55 is connected to the secondary supply port 65 through the duct box 59.

As a fume discharge system, as shown in FIG. 1, the chamber discharge port 71, the recoater head discharge port 73 and the secondary discharge port 75 are respectively connected to the fume collector 55 through the duct box 57. The clean inert gas after removal of fumes at the fume collector 55 is sent back to the chamber 1 to be reused.

Figure 5:
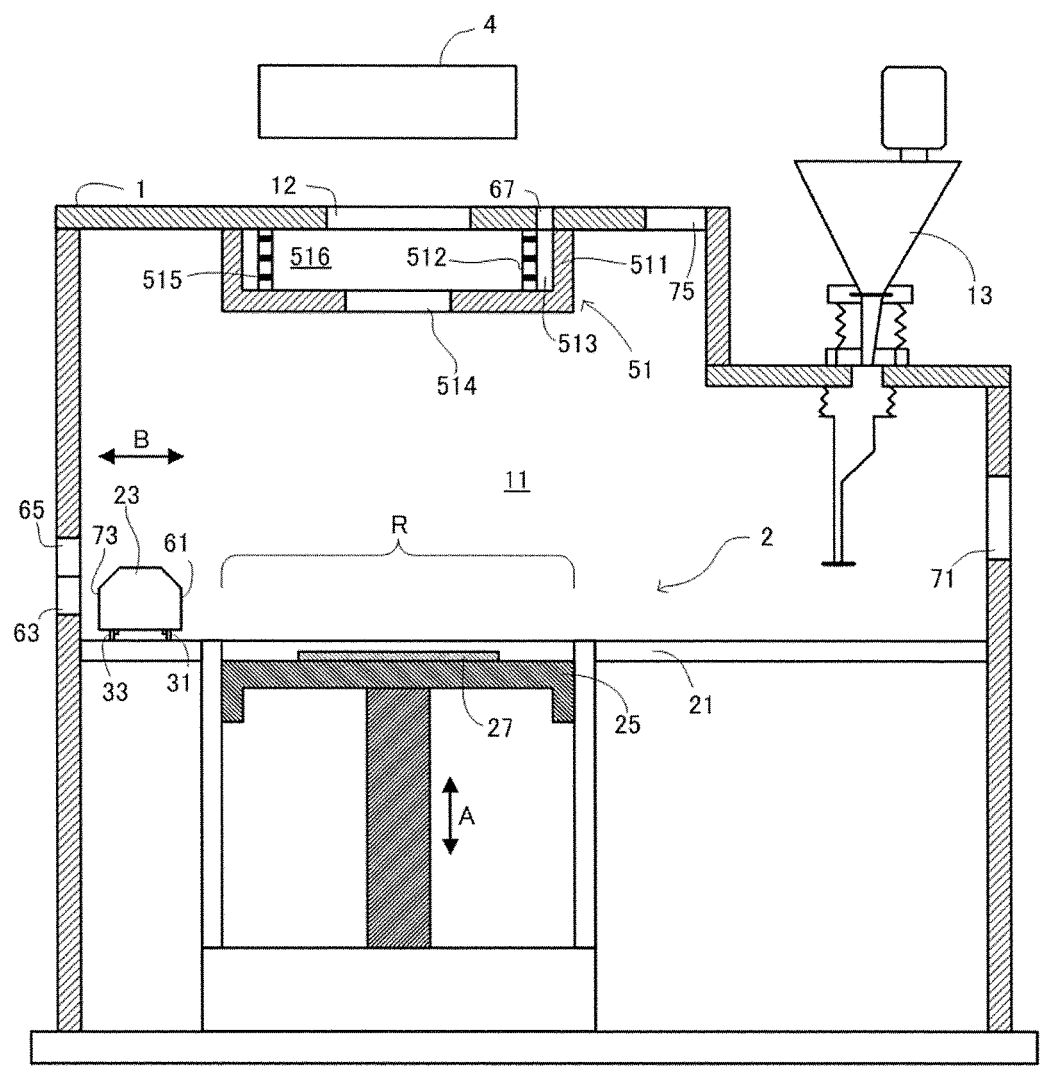
FIG. 5 illustrates a lamination molding method using a three-dimensional printer according to an embodiment of the invention.
Figure 6:
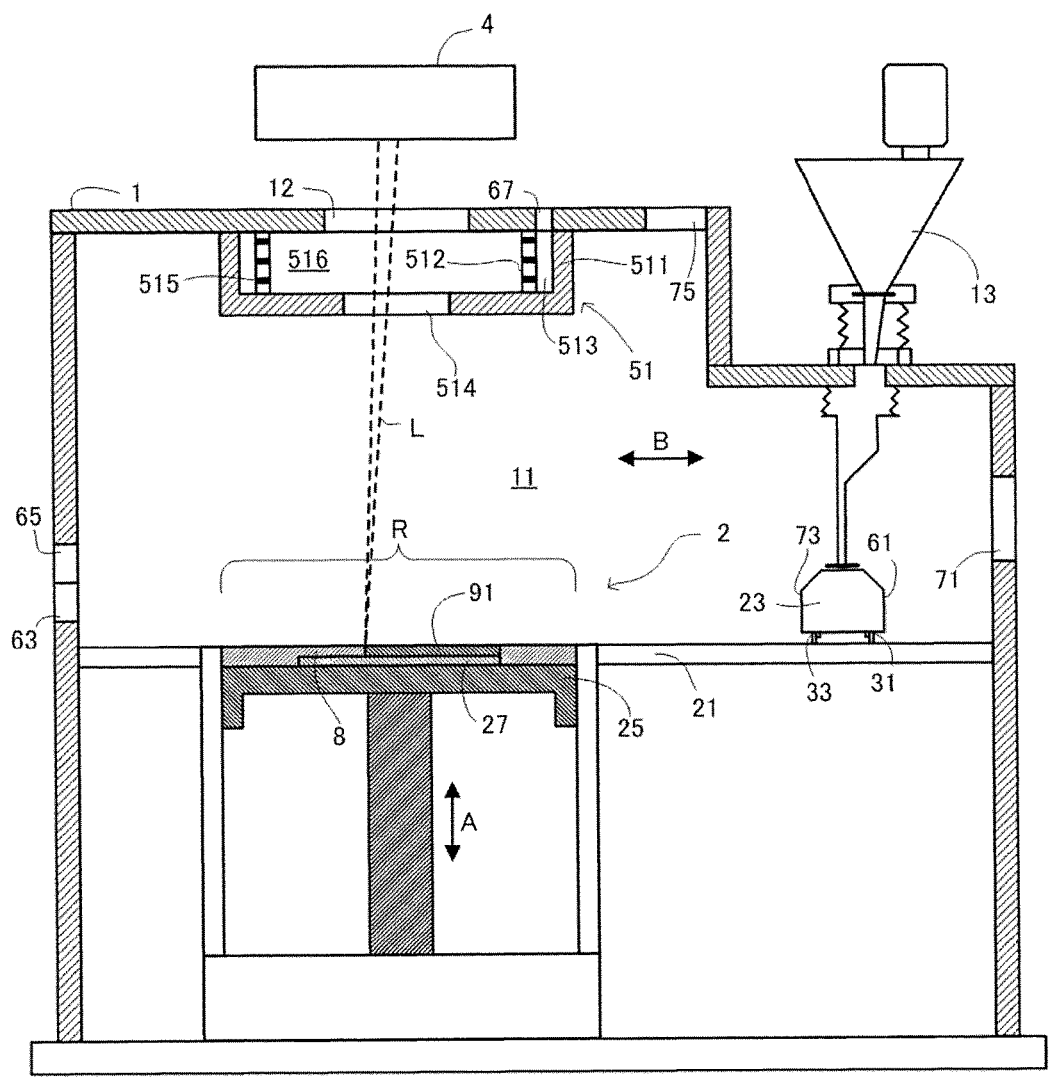
FIG. 6 illustrates the lamination molding method using the three-dimensional printer according to an embodiment of the invention.

Herein, a lamination molding method in the three-dimensional printer of the invention is explained based on FIG. 5 to FIG. 8. In FIG. 5 to FIG. 8, configurations unnecessary for the following explanation are properly omitted. First of all, as shown in FIG. 5, the molding plate 27 is placed on the table 25, and the height of the table 25 is adjusted to an appropriate position. In this state, the recoater head 23 in which the material containing portion 221 is filled with the material powder is moved in the direction shown by arrow B from the left side to the right side of the molding space R. The material powder discharged onto the molding plate 27 by the material discharge portion 225 is leveled to a predetermined thickness by the blade 33 with movement of the recoater head 23. At this moment, almost no pressure is applied to the material powder. In this way, the powder layer 8 having a predetermined thickness is formed on the molding plate 27. Next, as shown in FIG. 6, by irradiating the laser beam L on a predetermined irradiation region in the powder layer 8 and sintering the portion of the powder layer 8 irradiated with the laser beam, the first sintered layer 91 is obtained.

Figure 7:
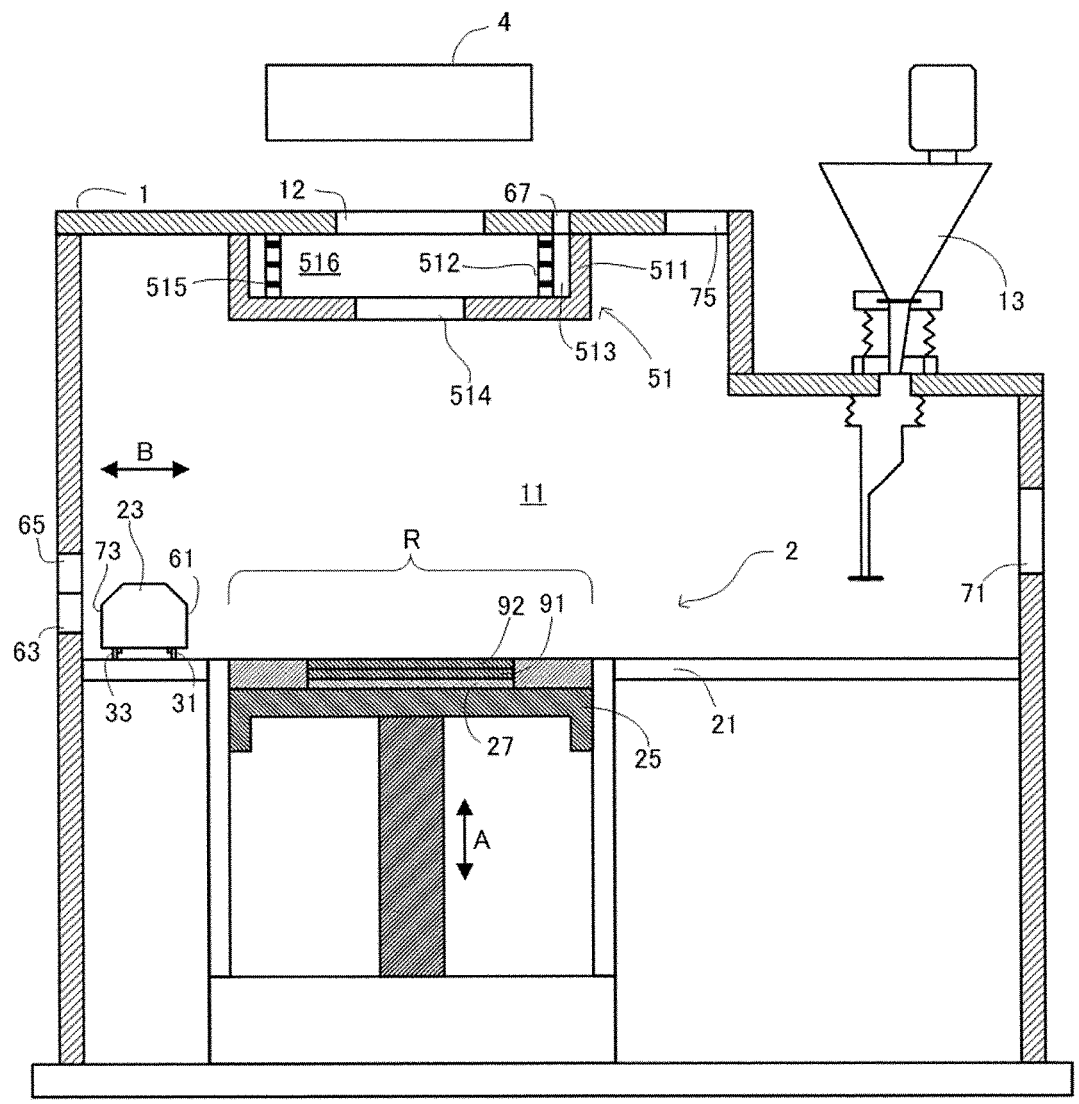
FIG. 7 illustrates the lamination molding method using the three-dimensional printer according to an embodiment of the invention.

Similarly, by lowering the height of the table 25 as much as one powder layer 8, and moving the recoater head 23 from the right side to the left side of the molding space R, the discharged material powder is leveled uniformly by the blade 31, and the powder layer 8 having a predetermined thickness is formed on the table 25 so as to cover the first sintered layer 91. Next, as shown in FIG. 7, by irradiating the laser beam L on a predetermined irradiation region in the powder layer 8 and sintering the portion of the powder layer 8 irradiated with the laser beam, the second sintered layer 92 is obtained.

By repeating the above processes, the third and subsequent sintered layers 9 are sequentially formed. The vertically adjacent sintered layers 9 are firmly fixed to each other.

Figure 8:
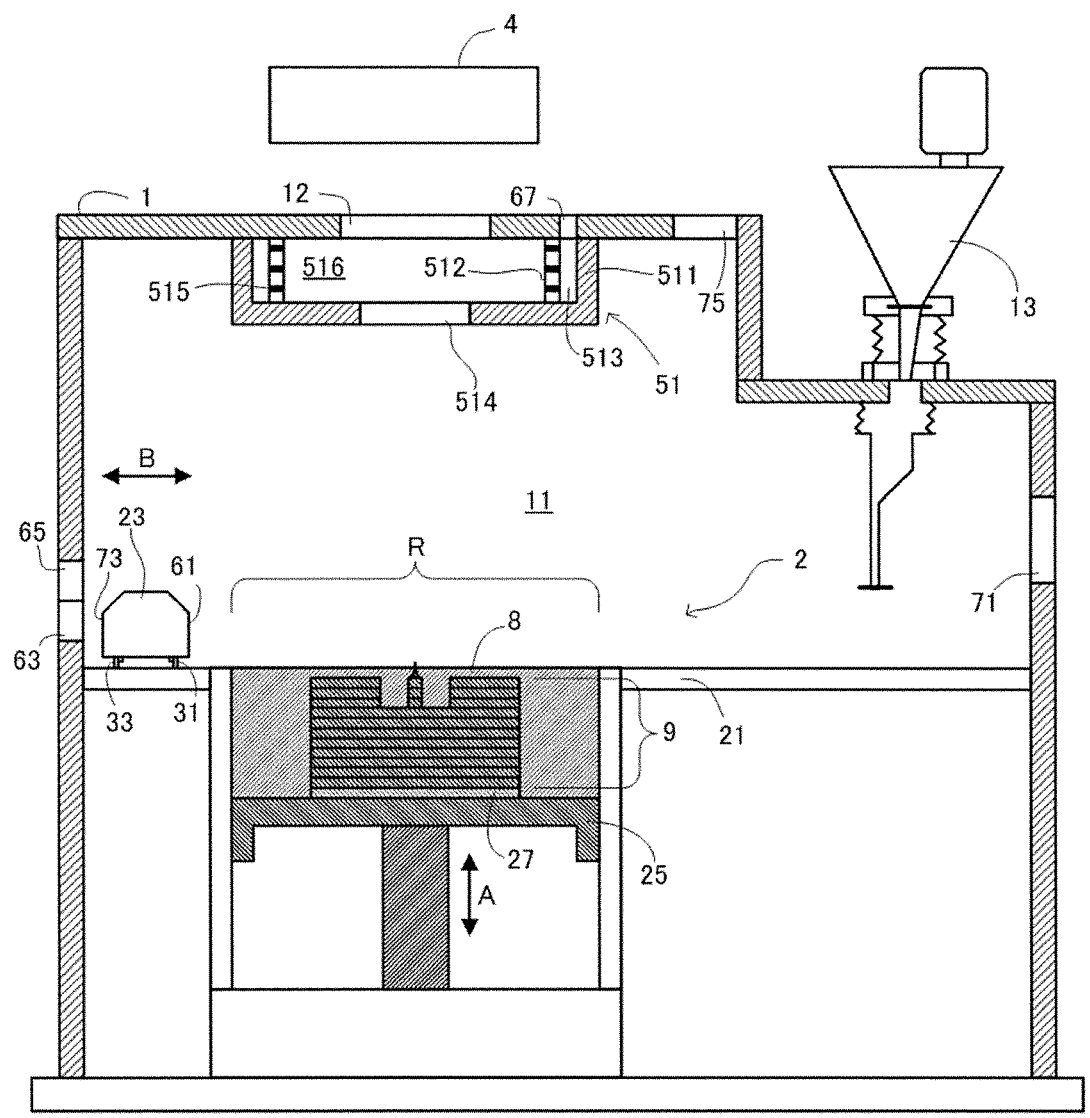
FIG. 8 illustrates the lamination molding method using the three-dimensional printer according to an embodiment of the invention.

Moreover, as shown FIG. 8, although a projected abnormal sintered portion may be formed on the sintered layer 9 during sintering of the powder layer 8, since the blades 31 and 33 are flexible to the extent that they can pass over the abnormal sintered portion, the abnormal sintered portion does not become a hindrance during formation of the next powder layer 8. In addition, since the powder layer 8 can be formed with almost no pressure applied thereto, even when recoating is performed on a sintered layer 9 having a fine shape, there is little chance of the sintered layer 9 being damaged.

Furthermore, since the blades 31 and 33 and the holding members 35 and 37 are demagnetized and have static electricity removed therefrom, adhesion of the material powder to the blades 31 and 33 and the holding members 35 and 37 due to magnetic force or static electricity can be suppressed, and a flatter powder layer 8 can be formed.

Moreover, the three-dimensional printer of the invention may include a processing head having a spindle attachable to a cutting tool, and cutting may be performed on an end surface of the molded object whenever a predetermined number of sintered layers 9 is formed. In addition, the abnormal sintered portion formed on a surface of the molded object may be removed by cutting. However, in order to avoid damage to the fine shape, it is desired that the above cutting be only performed on a portion having no fine shape and being less likely to be damaged.

The embodiment was chosen in order to explain the principles of the invention and its practical application. Many modifications and variations are possible in light of the above descriptions. It is intended that the scope of the invention be defined by the attached claims.

What is claimed is:

1. A three-dimensional (3D) printer, comprising:
a chamber covering a molding space;
a powder layer forming device uniformly spreading material powder in the molding space for each divided layer obtained by dividing a desired three-dimensional molded object at predetermined heights, so as to form a powder layer; and
a laser irradiation device irradiating a laser beam on a predetermined irradiation region of the powder layer to form a sintered layer, wherein
the powder layer forming device comprises:
a recoater head containing the material powder and discharging the material powder to the molding space;
a blade leveling the discharged material powder to a predetermined thickness; and
a holding member holding the blade on the recoater head, wherein
the blade is flexible, and
the blade and the holding member are nonmagnetic and electrically conductive, wherein the blade and the holding member has an absolute value of magnetic susceptibility of 0.1 or less and an electrical conductivity of $10^6$ S/m or more.

2. The three-dimensional printer according to claim 1, wherein the blade is formed of carbon fiber-reinforced plastic, and the holding member is formed of austenitic stainless steel.

3. The three-dimensional printer according to claim 2, wherein a tip of the blade is brush-shaped and has surface roughness equal to or less than a value of an average particle size of the material powder.

4. The three-dimensional printer according to claim 1, wherein the material powder is metal powder.

5. The three-dimensional printer according to claim 4, wherein the material powder has an average particle size of 5 to 50 μm.

6. The three-dimensional printer according to claim 1, wherein a tip of the blade is brush-shaped and has surface roughness equal to or less than a value of an average particle size of the material powder.

7. The three-dimensional printer according to claim 1, wherein the blade has a bending stress of 50 MPa or more to 150 MPa or less.

8. The three-dimensional printer according to claim 1, wherein the blade has heat resistance against a preheat temperature of the powder layer, and the preheat temperature of the powder layer is 50° C. or higher to 120° C. or lower.

9. The three-dimensional printer according to claim 1, wherein the holding member comprises a channel having longitudinal grooves for holding the blade and a flat bar fixing the channel to side surfaces of the recoater head.

10. The three-dimensional printer according to claim 1, wherein the blade is disposed perpendicular to a top surface of the powder layer, and a surface of a tip of the blade is parallel to the top surface of the powder layer.

* * * * *